No. 627,074. Patented June 13, 1899.
J. CONWAY.
APPARATUS FOR TAPPING MAINS.
(Application filed Sept. 9, 1898.)
(No Model.) 2 Sheets—Sheet 1.
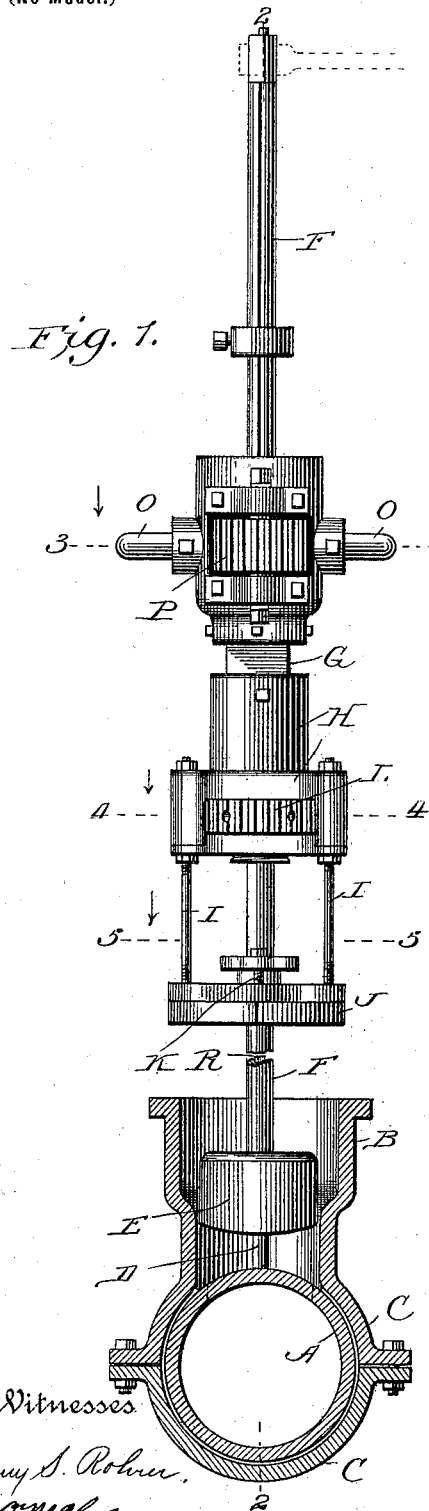
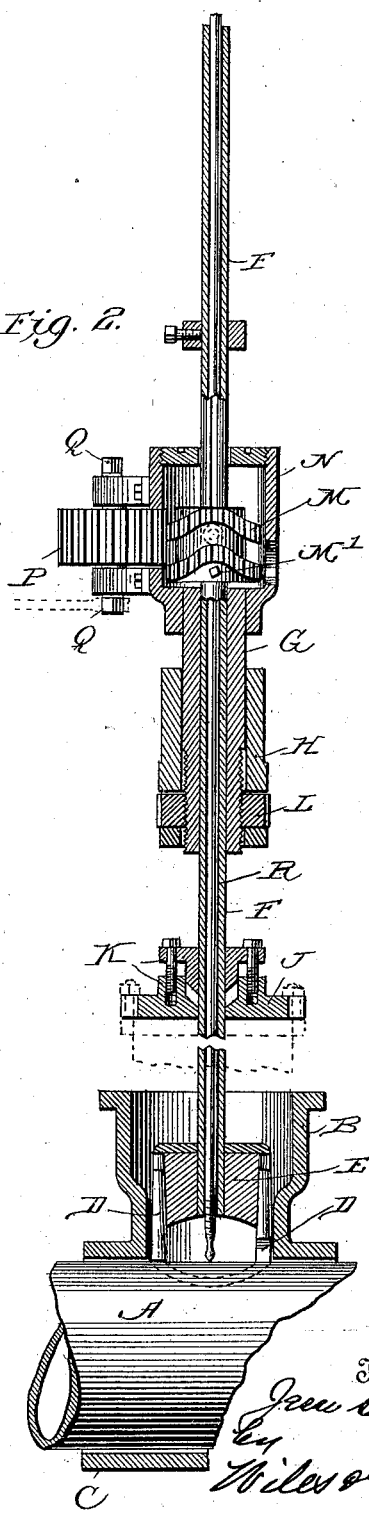
Witnesses
Harry S. Rohrer
F. O. McCleary
Inventor
Jno. Conway
by
Wiles & Greene,
Attorneys No. 627,074. Patented June 13, 1899.
J. CONWAY.
APPARATUS FOR TAPPING MAINS.
(Application filed Sept. 9, 1898.)
(No Model.) 2 Sheets—Sheet 2.
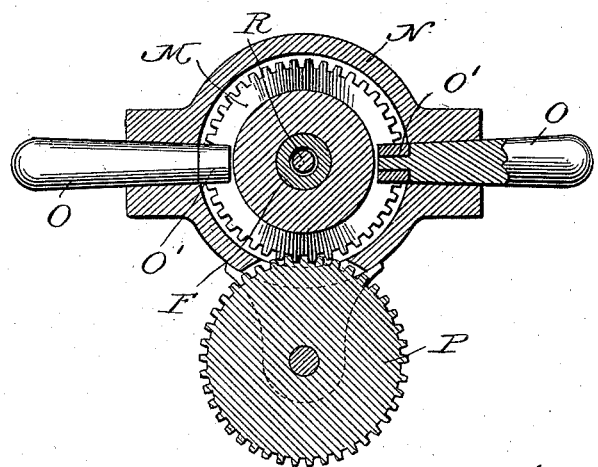
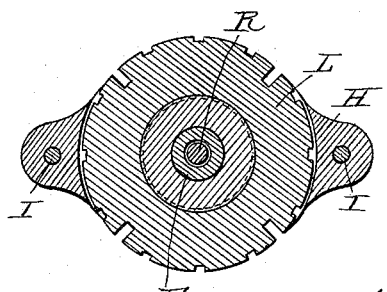
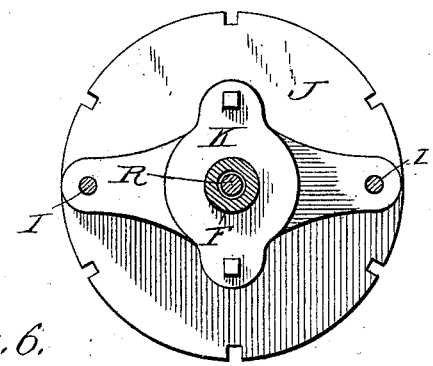
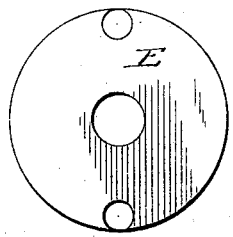
Witnesses
Harry S. Rohrer
Alex Scott
Inventor
Jesse Conway
by Wiles & Greene
Attorneys

UNITED STATES PATENT OFFICE.

JESSE CONWAY, OF BALTIMORE, MARYLAND, ASSIGNOR OF ONE-HALF TO MICHAEL A. McCORMICK, OF SAME PLACE.

APPARATUS FOR TAPPING MAINS.

SPECIFICATION forming part of Letters Patent No. 627,074, dated June 13, 1899.

Application filed September 9, 1898. Serial No. 690,576. (No model.)

*To all whom it may concern:*

Be it known that I, JESSE CONWAY, a citizen of the United States, residing at Baltimore, in the State of Maryland, have invented certain new and useful Improvements in Apparatus for Tapping Mains; and I do hereby declare the following to be a full, clear, and exact description of the invention, such as will enable others skilled in the art to which it appertains to make and use the same.

This invention, although adapted for more general use, is especially intended to facilitate cutting large openings in large water mains or pipes. Where, as is usually the case, a tubular saw or its equivalent is used for this purpose, the saw, owing to the curvature of the pipe-wall, must advance through a distance materially greater and often many times greater than the thickness of the pipe, the total advance in some cases being more than a foot. The cutting goes on through the entire time of this advance, the thickness of metal cut away in a single revolution is necessarily slight, and while many revolutions are therefore required because rotary movement is produced by a hand-lever acting through a very small arc rotation is very slow and the time required for completing such tapping is very great and the cost surprisingly large. Again, the saw cuts at first only upon two diametrically opposite sides of the disk to be removed, later cuts across the walls at four points, and finally cuts again at but two points, and hence it is evident that where the disk cut out is large in proportion to the diameter of the pipe from which it is cut the refractory outer surface or scale— "skin," the workmen often call it — is cut transversely bit by bit and carried into the kerf during the whole operation, injuring the cutter, retarding the progress, and increasing the muscular effort required. Still further, when the cutting is being done at two or four widely-separated points only the cutter must have many teeth, else each tooth on arriving at a working point will engage too deeply, and the expense of making and afterward sharpening such cutters is very large. Practically the expensive machines heretofore in use have been carried from city to city as occasion required and have been worked night and day by relays of men until the work once begun was completed.

This invention eliminates most of the evils just suggested, as well as some others, by using few cutting-teeth (one or more, two being chosen for illustration) and arranging them to be automatically advanced and retracted in such manner as to follow the surface of the pipe and cut continuously, the cutter having a feed movement independent of its reciprocating action, and thus advancing as the metal is cut away. It follows that the hard-surface portion of the pipe is removed at the outset without materially injuring the cutting-tool and that when the advance, which may be substantially as rapid as in the old machines for this purpose, is slightly greater than the thickness of the pipe-wall the operation is complete.

In the accompanying drawings, Figure 1 is an elevation showing the apparatus in position for operating upon a main, certain parts of the machine without novelty herein claimed and the action of which is well understood in the art being omitted. Figs. 2, 3, 4, and 5 are sections at 2 2 3 3 4 4 5 5, Fig. 1. Fig. 6 is a plan view of a certain cutter-head.

In the figures, A represents a main to be tapped, and B a short branch pipe formed integrally with one-half of a divided sleeve C, which is clamped to the main and packed with lead or other suitable material in the usual manner. This branch being thus fixed in place, an opening approximately equal in diameter to the internal diameter of the branch is cut from the main by slightly-conical cutters D, driven into a steel cutter-head E, fixed upon the end of a tubular shaft F. This shaft both rotates and slides in a sleeve G, which itself slides without rotation in a heavy bearing H. The bearing is connected by rods I to a disk J, carrying a stuffing-box K for the rod F. The disk, stuffing-box, and other parts connecting them with the branch pipe have no novelty and are here shown in part merely to explain the relation of the novel devices to other well-known parts.

The sleeve G is threaded at its lower end, and the threaded portion is engaged by a feednut L, revolubly fixed to the bearing H, whereby the sleeve is fed longitudinally in either direction with respect to the bearing. Upon the shaft F a circumferentially-grooved cam M is fixed by means of a set-screw M', and by means of a spline the cam is further held against rotation upon the shaft and is also accurately set. The cam is inclosed by a heavy frame or case N, rigidly connected with the sleeve and long enough to allow a considerable bodily longitudinal movement of the cam. In the walls of the case are removably fixed diametrically opposite projections or studs O, which enter the cam-groove and bear antifriction-rollers O'. It is evident that this construction forces the cam and its shaft to slide back and forth whenever they rotate, and the form of the cam is such that the shaft so advances and retreats as to hold each cutter at all times against the wall of the pipe A. The shaft and cam are rotated by power devices attached to the shaft's squared upper end, manual levers being usually employed in this machine as in others of the same class. To conveniently allow additional men to add their strength in operating the machine, a gear P is mounted upon the case N to project through a slot therein and engage the peripheral teeth upon the cam, and the shaft of this gear is extended beyond its bearings at Q, so that power may be applied at one or both these points.

When different sizes of mains and branches are to be operated upon, different heads E are used, and cams of the same diameter, but differently grooved, are substituted one for the other, and so, also, where one cutter is used instead of two the pipe can be cut at an acute angle if the cam be of proper form.

In order that the disk when cut free from the pipe may not move out of place, a rotary sliding rod R is fitted into the tubular shaft F and threaded at its lower end to be screwed into a central aperture in the disk, and, if desired, this threaded end may be a drill-pointed tap adapted to cut and thread the aperture in which it lies when holding the disk. Packing may be placed around the rod at any convenient point, if desired; but this is not indispensable.

As has been suggested, the devices for cutting off the pressure of water on the detached disk and for removing the disk and cutters from the branch pipe notwithstanding the great pressure in the main form no part of this invention. It may be observed that if the cam be removed or be thrown out of action by withdrawing the studs O this apparatus may be used for cutting a disk from a plane plate, or if the common tubular saw replace the cutter-head it may cut a disk from a pipe in the old way.

Since the mechanism producing the novel results may be varied without passing beyond the limits of my invention, I do not wish to limit myself to the constructions and combinations chosen for illustration, but desire to claim the invention broadly as well as specifically.

What I claim is—

1. For tapping mains, the combination with a cutting-tool mounted to revolve bodily about a fixed axis, of automatic means for moving said tool back and forth parallel to that axis during each revolution.

2. The combination with a rotary shaft carrying a cutter at one side of its axis, of means for sliding the shaft longitudinally, during each rotation, at such time and rate as to carry said cutter in a path lying in the intersection of the cylindrical surface in which it moves with another cylindrical surface.

3. The combination with a cutting-tool mounted to revolve bodily about a fixed axis, of means for reciprocating the tool, parallel to said axis, during each revolution, and also giving it simultaneous permanent advance.

4. The combination with a rotary cutter-head having a projecting tooth or cutter parallel to and at one side of its axis, of means for rotating the cutter-head, and means for advancing and retracting the tooth during such rotation; whereby the tooth may act continuously upon a cylindrical surface.

5. The combination with a rotary tubular shaft mounted to slide longitudinally, of a cutter-head fixed to the end of the shaft and carrying a cutting-tooth at one side of its axis and parallel thereto, means whereby the rotation of the shaft causes it to move back and forth longitudinally, and a rod arranged for sliding and rotation in the shaft and provided with a threaded end to project from the head in the axis of the path followed by the cutter.

6. The combination with the shaft mounted to rotate and to slide longitudinally and bearing a terminal cutter at one side of its axis, of a cam arranged to force bodily reciprocating movement of the shaft as it rotates, and means for feeding the shaft longitudinally during its rotary and reciprocating movements.

7. The combination with the rotary sliding shaft carrying the cutter, of the cam secured to the shaft, a normally stationary projection engaging the cam, and means for at will adjusting said projection in a direction parallel to the shaft's axis; whereby the cutter receives a feed movement independent of its other movements.

8. The combination with the cutter-bearing, rotary, sliding shaft, of a sleeve forming a bearing for the shaft and itself mounted to slide without rotation in a normally-fixed bearing, a sleeve-feeding device secured to said fixed bearing, and means whereby the sleeve when fed carries with it the shaft which it incloses.

In testimony whereof I affix my signature in presence of two witnesses.

JESSE CONWAY.

Witnesses:
HARRY C. MATHIEU,
JOHN B. SANNER.